United States Patent [19]

Masuda et al.

[11] Patent Number: 4,789,912
[45] Date of Patent: Dec. 6, 1988

[54] MAGNETIC RECORDING AND REPRODUCING APPARATUS OF ROTARY HEAD TYPE

[75] Inventors: Kenmei Masuda, Yokohama; Toshimichi Terada, Chigasaki; Kenji Ogiro, Yokohama; Shozo Yokoo, Yokohama; Osamu Uchiyama, Yokohama, all of Japan

[73] Assignee: Hitachi, Ltd., Tokyo, Japan

[21] Appl. No.: 4,558

[22] Filed: Jan. 20, 1987

[30] Foreign Application Priority Data

Jan. 18, 1986 [JP] Japan ............................ 61-7176

[51] Int. Cl.$^4$ ............................................ G11B 5/027
[52] U.S. Cl. ........................................ 360/85; 360/95; 360/96.5
[58] Field of Search .................... 360/85, 96.5, 95

[56] References Cited

U.S. PATENT DOCUMENTS 4,517,614  5/1985  Straub ................................. 360/85
4,642,714  2/1987  Miyamoto ........................ 360/96.5

FOREIGN PATENT DOCUMENTS 59-171070  9/1984  Japan ................................... 360/85

Primary Examiner—A. J. Heinz
Attorney, Agent, or Firm—Antonelli, Terry & Wands

[57] ABSTRACT

A magnetic recording and reproducing apparatus of rotary head type such as a rotatable video tape recorder has a tape guide for guiding the magnetic tape when the tape runs on and around a cylinder carrying rotary heads. A tape loading movable member carries the tape guide. A tape loading drive is provided for driving the tape loading movable member so as to move the tape guide between a tape loading position where it places the magnetic tape in contact with the cylinder through a predetermined angle and an unloading position where it keeps the magnetic tape away from the cylinder. A locating unit is provided on at least one of the cylinder and a cylinder base carrying the cylinder. The locating unit is adapted for engaging with the tape loading movable member in the tape loading position so as to locate the tape guide with respect to the cylinder. The tape loading drive drives the tape loading movable member by making use of the mechanical motion of a cassette holder for mounting the cassette on a predetermined portion of the apparatus.

5 Claims, 11 Drawing Sheets

MAGNETIC RECORDING AND REPRODUCING APPARATUS OF ROTARY HEAD TYPE

BACKGROUND OF THE INVENTION

1. Field of the Invention

The present invention relates to a magnetic recording and reproducing apparatus of rotary head type suitable for use as, for example, a small-size and light-weight video tape recorder or as a small-size and light-weight digital audio tape recorder.

2. Description of the Prior Art

Magnetic recording and reproducing apparatus of rotary head type, which employ a rotary head for conducting helical scanning of a magnetic tape, are widely used as, for example, a home video tape recorders. In recent years, there is an increasing demand for reduction in the size and weight of the apparatus of the kind described, in order to realize a portable type apparatus as in the case of video tape recorder integrated with a camera. On the other hand, the magnetic recording and reproducing apparatus of rotary head type is finding a spreading use, and attempts have been made to use this type of apparatus as a digital audio tape recorder. In this case, it is desired that the apparatus be designed to have a compact construction which will compose with that of ordinary analog audio tape recorders having a stationary head type. Namely, the reduction in the size and weight is the most important requisite for this type of apparatus.

The magnetic recording and reproducing apparatus of rotary head type, however, essentially requires a tape loading mechanism for extracting the magnetic tape from a cassette and for making the extracted tape run around a head cylinder through a predetermined angle. The attempts for reduction in the size and weight have encountered a difficulty due to the necessity for the tape loading mechanism.

Japanese Post-Examination Patent Publication No. 11207/1978, for example, discloses a tape loading mechanism. This mechanism requires a highly complicated arrangement for loading a magnetic tape on a head cylinder in a predetermined positional relationship, as well as a specific driving means for loading the magnetic tape. In consequence, the size of the tape loading mechanism is undesirably increased, thus making it difficult to reduce the size and weight of the magnetic recording and reproducing apparatus.

SUMMARY OF THE INVENTION

Accordingly, an object of the present invention is to provide a magnetic recording and reproducing apparatus of rotary head type, in which the construction of the tape loading mechanism is simplified to contribute to a reduction in the size and weight of the apparatus as a whole, thereby overcoming the problems of the prior art.

To this end, according to the present invention, there is provided a magnetic recording and reproducing apparatus of rotary head type having a tape loading mechanism which extracts a portion of a magnetic tape from a cassette held by a cassette holder through a front opening of the cassette and places the portion of the magnetic tape on and around a cylinder carrying a rotary head through a predetermined angle, the magnetic recording and reproducing apparatus comprising: tape guide means for guiding the magnetic tape; a tape loading movable member carrying the tape guide means; tape loading driving means for driving the tape loading movable member so as to move the tape guide means between a tape loading position and an unloading position; and locating means provided on the at least one of the cylinder and a cylinder base carrying the cylinder, the locating means being adapted for engaging with the tape loading movable member in the tape loading position so as to locate the tape guide means with respect to the cylinder.

With this arrangement, it is possible to obtain a tape loading mechanism having a simple construction but yet capable of loading a magnetic tape around a head cylinder without impairing the positional precision of the tape with respect to the cylinder.

In a preferred form of the present invention, the tape loading driving means is adapted to drive the tape loading movable member by making use of the mechanical motion of the cassette holder for mounting the cassette on predetermined portion of the apparatus.

With this arrangement, it is possible to eliminate necessity for any specific driving means for the tape loading operation. This also contributes to simplification of construction of the tape loading mechanism. In addition, the tape loading operation can be automatically conducted quickly and easily, in response to the operation for mounting the tape cassette.

The above and other objects, features and advantages of the present invention will become clear from the following description of the preferred embodiments taken in conjunction with the accompanying drawings.

DESCRIPTION OF THE PREFERRED EMBODIMENTS

Figure 1:
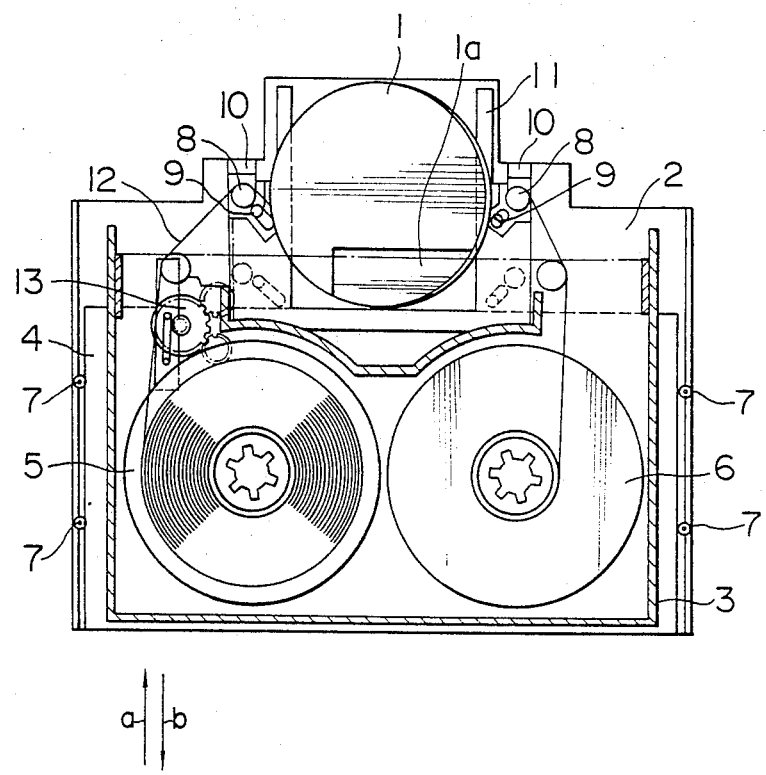
FIG. 1 is a plan view of the whole portion of a first embodiment.
Figure 2:
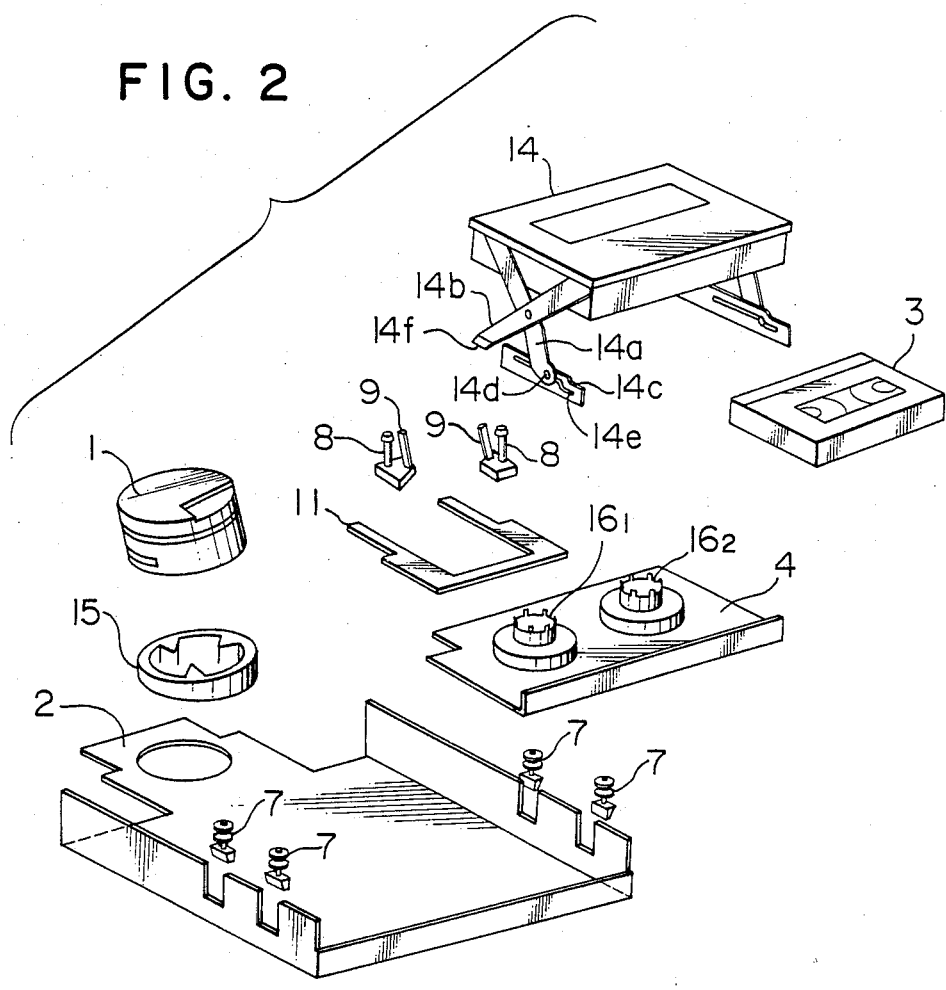
FIG. 2 is an exploded perspective view of the first embodiment.

Referring to FIGS. 1 and 2 which are a plan view and an exploded perspective view of a first embodiment, a cylinder section generally designated by a numeral 1, which mounts a rotary head, is fastened to a cylinder base 15 by means of screws (not shown) which are screwed into threaded holes (not shown). The cylinder base 15 in turn is fixed to a chassis 2 by means of screws. The cylinder section 1 is provided with a notch 1-a for preventing interference between the top portion of the cylinder and a cassette 3.

The cassette 3 receives a supply reel 5 and a take-up reel 6. A slider plate 4 is adapted to slide along a plurality of roller sections 7 (four roller sections 7 are provided in the illustrated embodiment) in the directions of arrows a and b in FIG. 1. As will be clearly seen from FIG. 2, a supply reel motor $16_1$ and a take-up reel motor $16_2$ are carried by the slide plate 4.

Figure 3A:
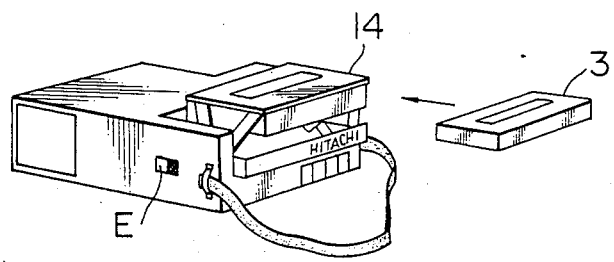
FIGS. 3 A to 3C are illustrations of the movement of a cassette holder.
Figure 3B:
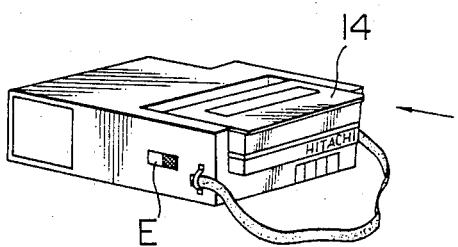

A slider 11, which constitutes a movable member as an essential part of a tape loading mechanism, is a substantially C-shaped member with two legs which engage with later-mentioned guide grooves formed in side portions of the cylinder section 1 and the cylinder base 15. The slider 11 is slidable on the slide plate 4 in the same direction as the slide plate 4, i.e., in the direction of arrows a and b in FIG. 1. A guide roller 8 and an inclined pin 9, which in cooperation constitute a guide means for guiding a magnetic tape 12, are provided on the slider 11. A gear train 13, which is omitted from FIG. 2, is secured to the chassis 2 and is adapted to magnify and transmit the movement of the slide plate 4 in the direction of the arrow a or b to the slider 11, thus causing a movement of the slider 11 relative to the slide plate 4 in the same direction as that of the movement of the slide plate 4. A numeral 10 denotes a stopper which operates when the slider 11 is driven in the direction of the arrow a. The stopper 10 is omitted in FIG. 2. Referring specifically to FIG. 2, a cassette holder 14 is provided at its both sides with X-shaped legs 14a, 14b and engaging plates 14c connected to these legs. The cassette holder 14 is mounted, through these legs 14a, 14b and engaging plates 14c, on the slide plate 4 for movement in the vertical direction, as well as forward and backward directions (directions of arrows a and b in FIG. 1). More specifically, the cassette holder 14 is resiliently urged by, for example, a spring and is held in a raised position when it is in the eject condition as shown in FIG. 3A. However, as the user places the cassette 3 in the cassette holder 14 and presses the same downward, the cassette holder 14 is lowered with its legs 14a, 14b progressively depressed by rotation of levers of these legs about the crossing points of the X-shapes of the respective legs, as shown in FIG. 3B. In consequence, guide pins 14d provided on the legs 14a are made to slide along grooves 14e formed in the engaging plates 14c fixed to the slide plate 4, until they come into engagement with steps formed in these grooves 14e. Although not shown, the ends of the levers constituting each X-shaped leg are suitably bent as at 14f for engagement with a suitable guide means which is provided on the slide plate 4 for the purpose of guiding the opening motion of each leg.

Figure 3C:
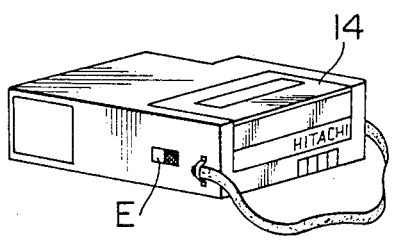

When the cassette holder 14 is in the lowered position, supply and take-up reels 5, 6 in the cassette fit on the reel driving shafts of the supply reel motor $16_1$ and the take-up reel motor 162. Then, as the user presses the cassette holder 14 in the direction of the arrow in FIG. 3B which is the same as the arrow a in FIG. 3A, the cassette holder 14 is locked by a suitable locking means (not shown) as shown in FIG. 3C, thus completing the mounting of the cassette. Needless to say, the cassette holder 14 is unlocked to resume the eject position shown in FIG. 3A, simply by pressing an eject button E shown in FIG. 3A.

In the described embodiment, since the pin 14d on the leg 14a of the cassette holder 14 engages with the step formed in the groove 14e formed in the engaging plate 14c secured to the slide plate 4, the downward pressing of the cassette holder 14 to the position shown in FIG. 3C causes the slider plate 4 to be moved in the direction of the arrow a in FIG. 1. According to the invention, the tape loading operation for loading the magnetic tape 12 on the cylinder section 1 is conducted by making an effective use of the movement of the slide plate 4, as will be understood from the following description.

FIG. 1 shows the apparatus in a state after completion of the tape loading operation. However, in the state in which the apparatus has not been loaded with the tape, i.e., in the unloaded state of the apparatus, the slide plate 4 takes a position retracted in the direction of the arrow b from the position shown in FIG. 1. The slider 11, which is drivingly connected to the slide plate 4 through the gear train 13, also is in the retracted position. Therefore, the guide roller 8 and the inclined pin 9 carried by the slider 11 are in the unload positions shown by broken lines in FIG. 1.

As the user places the cassette 3 in the cassette holder 14 and presses the cassette 3 downward to lower the cassette holder 14 to the position shown in FIG. 3B, the guide roller 8 and the inclined pin 9 are inserted into the cassette 3 through the lower opening of the cassette 3. In this state, the guide roller 8 and the inclined pin 9 are ready for extracting the magnetic tape 12 from the front opening of the cassette 3. then, as the cassette holder 14 is pressed in the direction of the arrow a, the slide plate 4 also is moved forwardly in the direction of the arrow a. This forward movement of the slide plate 4 is magnified and transmitted to the slider 11, so that the slider 11 also is moved forwardly until the base portion of the guide roller 8 carried by the slider 11 is stopped by the stopper 10. The forward movement of the slider 11 in turn causes the magnetic tape 12 to be extracted from the cassette 3 by the action of the guide roller 8 and the inclined pin 9 and be placed in contact with the cylinder section 1 over a predetermined angle, whereby the tape loading operation is completed.

As explained above, the slider 11 is guided by guide grooves formed in side portions of the cylinder section 1 and the cylinder base 15 during its forward movement, so that the position of the slider 11 relative to the cylinder section, both in the heightwise and lateral directions, is strictly controlled. In consequence, the guide roller 8 and the inclined pin 9 also are precisely located with respect to the cylinder section 1, thereby to constantly form a correct path along which magnetic tape 12 runs after the tape loading. It is to be noted that the formation of the tape running path can be correctly conducted without fail, simply by causing the slider 11 to be guided and located by the guide grooves, without necessitating any specific other guiding means, whereby the construction of the loading mechanism for loading the magnetic tape can remarkably simplified.

It is to be noted also that, in the described embodiment, the forward movement for loading the tape and the backward movement for unloading the tape are effected by making an effective use of the mounting and ejecting operations for mounting and ejecting the cassette 3, thus eliminating necessity for any specific driving power for the loading and unloading of the tape, thus contributing to a further simplification of the tape loading mechanism, as well as to quicker and easier tape loading and unloading operations.

The first embodiment of the invention has been generally described. The detail of each section will be described in more detail hereinunder, with specific reference to FIGS. 4 to 14.

Figure 4A:
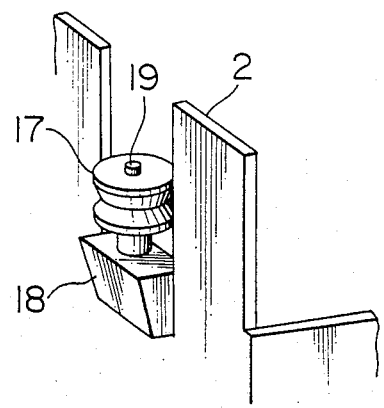
FIGS. 4A and 4B are illustrations of an example of a roller means for guiding a slide plate.
Figure 4B:
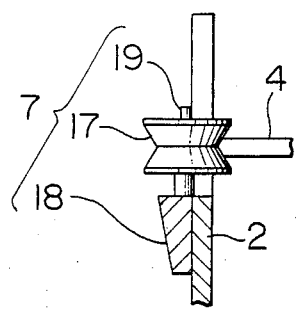

FIGS. 4A and 4B show an example of the roller section 7 for guiding the slide plate 4 when the latter is moved forward and backward. More specifically, FIG. 4A is a perspective view of the roller section 7, while FIG. 4B is a sectional view of the same. As will be seen from these Figures, the roller section 7 includes a rotatable roller 17, a shaft 19 rotatably supporting the roller 17, and a holding member 18 fixed to the chassis 2 and adapted to hold the shaft 19. It will be seen also that the roller 17 has a peripheral surface with a V-shaped groove. An end of the slide plate 4, having a V-like shape conforming with the slide plate 4, fits in this groove, so that the position of the slide plate 4 is determined in the vertical direction by this V-shaped groove.

Figure 5:
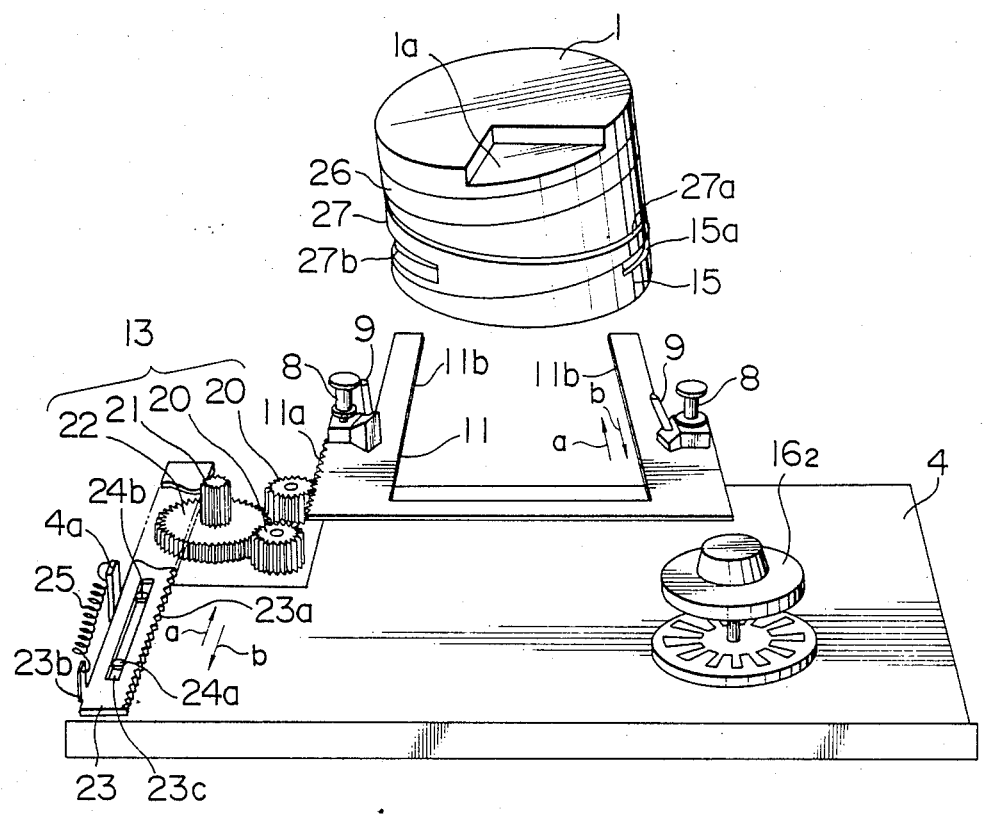
FIG. 5 is a perspective view of an example of a slider driving mechanism.

FIG. 5 illustrates the driving mechanism for driving the slider 11, incorporating the gear train 13 and constituting the tape loading driving means. The gear train 13 is constituted by gears 20–22 which are rotatably supported by the chassis 2 (see FIGS. 1 and 2). The gear 21 meshes with gear teeth 23a of a rack plate 23 having an elongated slot 23c which receives a pair of guide pins 24a, 24b. The rack plate 23 is movable in the direction of the arrows a and b as the edges of the elongated slot 23c are guided by the pins 24a, 24b. A reference numeral 25 designates a tension spring which is stretched between a lug 4a cut and raised from the slide plate 4 and a lug 23b cut and raised from the rack plate 23 so as to urge the rack plate 23 in the direction of the arrow a. In consequence, the rack plate 23 is held at a position where one end of the elongated slot 23c abuts one 24a of the guide pins. A reference numeral 11a denotes teeth formed on an end surface of the slider 11. The toothed surface 11a are adapted to mesh with one of two gears 20 within the range of movement in the direction of the arrow a or b. Referring to FIG. 5, the cylinder section 1 has a rotary cylinder 26, a lower fixed cylinder 27 having a tape guide zone 27a, and the cylinder base 15 mentioned before. The lower fixed cylinder 27 and the cylinder base 15 are provided with the aforementioned guide grooves 27b, 15a for guiding the respective legs 11b of the slider 11.

The driving mechanism for driving the slider 11 having the described construction operates in a manner which will be explained hereinunder with specific reference to FIGS. 6 and 7.

Figure 6:
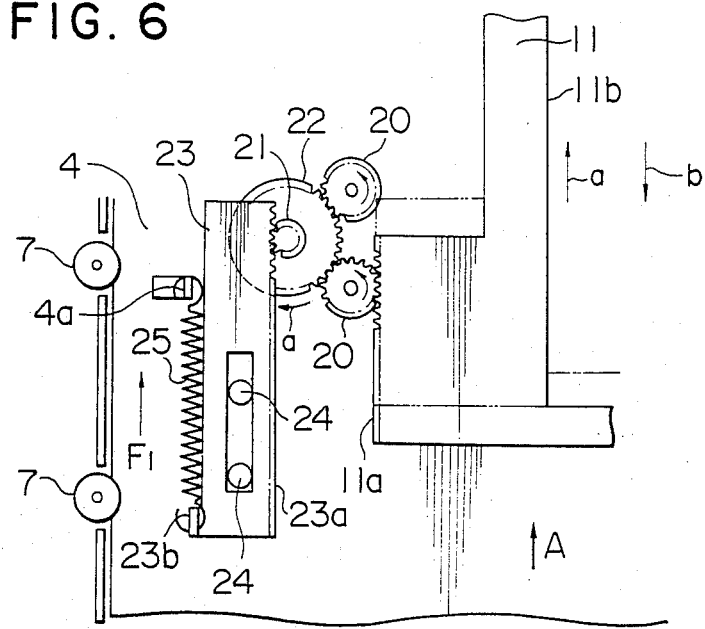
FIGS. 6 and 7 are illustrations of operation of the slider driving mechanism.
Figure 7:
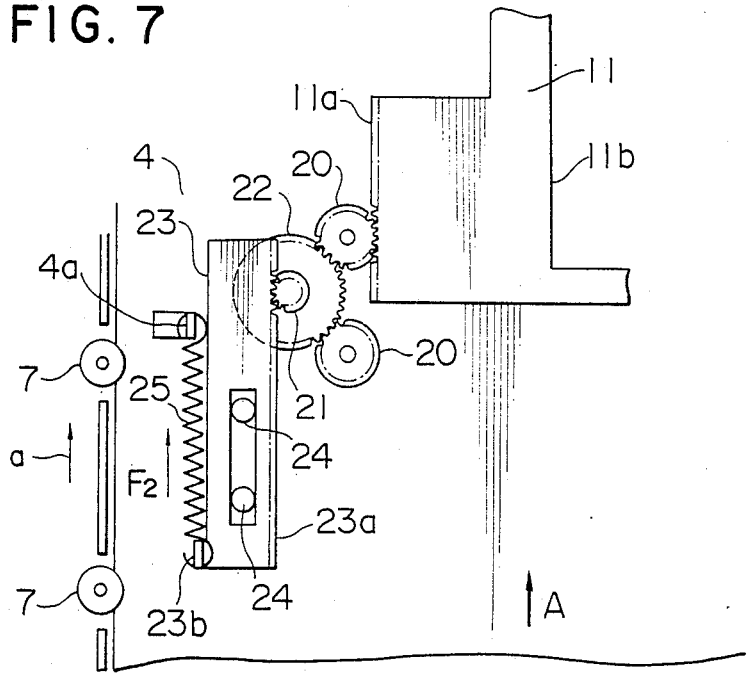

FIG. 6 illustrates the driving mechanism in the unloaded state, i.e., in the state before the loading of the magnetic tape. As the slide plate 4 is moved in the direction of an arrow A in response to the operation for mounting the cassette, the rack plate 23 is pulled through the tension spring 25 in the direction of the arrow A. This movement of the rack plate 23 is transmitted to the toothed surface 11a of the slider 11 through the teeth 23a of the rack plate 23 and the gears 21, 22 and 20. In consequence, the slider 11 moves in the direction of the arrow A to the tape loading position where it is stopped by the stopper 10 shown in FIG. 1, so that the tape loading operation for loading the magnetic tape is conducted in the manner explained before. When the slider 11 is stopped by the stopper 10, the rack plate 23 also is stopped because it is drivingly connected to the slider 11 through the gears 20 to 22. However, the slide plate 4 slightly moves in the direction of the arrow A to the position shown in FIG. 7, even after the rack plate 23 is stopped, so that the tension spring 25 is stretched so as to produce a large tensile force as indicated by an arrow $F_2$ in FIG. 7. This force $F_2$ acts to increase the force by which the slider 11 is pressed onto the stopper 10, thus ensuring precise positioning of the slider 11 in the direction of the arrow A.

Needless to say, the design must be such that the tension spring 25 produces, before it is stretched by the movement of the slide plate 4, a force $F_1$ (see FIG. 6) which is large enough to load the tape overcoming the sum of the forces such as the friction resistance produced during the sliding of the slider 11 and the resistance encountered when the magnetic tape is extracted from the cassette.

The slide plate 4 is locked at the position shown in FIG. 7 against the tensile force $F_2$ of the tensile spring 25 by a suitable locking mechanism which will be mentioned later, whereby the magnetic tape is held in the loaded condition. Then, as the eject button explained in connection with FIG. 1 is pressed, the slide plate 4 is unlocked and is reset in a predetermined position by the force of the tensile spring 25. The slide plate 4 is then returned to the position shown in FIG. 6 in response to the ejecting operation of the cassette (backward movement of the cassette holder 14 mentioned before), so that the slider 11 also is returned in the direction of the arrow b to the position shown by full line in FIG. 6.

The gears 20 to 22 serve to transmit the movement of the slide plate 4 to the slider 11 while magnifying the amount of the movement. By virtue of this function of the gears, it is possible to convert a comparatively small movement of the cassette holder 14 for mounting and ejecting the cassette into a movement of the slider 11 large enough to complete the tape loading. The provision of the gears 20 to 22, however, is not essential. Namely, these gears may be omitted provided that the recording and reproducing apparatus is designed to afford a large amount of movement of the cassette holder 14.

Figure 8:
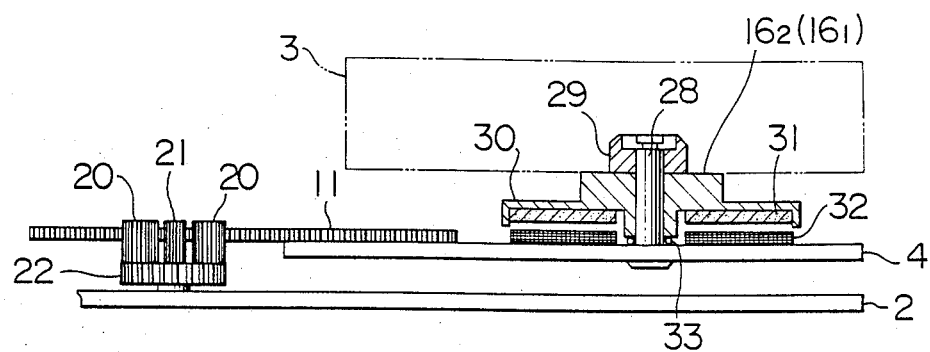
FIG. 8 is a fragmentary sectional view of the slider driving in FIG. 5.

FIG. 8 is a fragmentary sectional view of the apparatus shown in FIG. 5. As will be seen from this Figure, the gears 20 to 22 and the slider 11 are mounted within the height of the reel motors $16_2$ and $16_1$. The rack plate 23, which is omitted from FIG. 8, also is mounted at the same level as the slider 11. Thus, the provision of the gears 20 to 22, slider 11 and the rack plate 23 does not increase the height of the recording and reproducing apparatus. As well known to those skilled in the art, each of the reel motors $16_1$ and $16_2$ is composed of a stationary shaft 28, crown 29, magnet holder 30, magnet 31, print coil 32 and a thrust bearing 33. The stationary shaft 28 is press-fit into a hole formed in the slide plate 4. The crown 29, magnet holder 30 and the magnet 31 rotate at different speeds in various operation modes such as fast forwarding, rewinding and playback, in accordance with voltage which is supplied to the print coil 32 in a controlled manner. In stopping mode of the operation, the magnet holder 30 is stopped by a braking frictional force which is applied thereto by a suitable means which is not shown.

Figure 9:
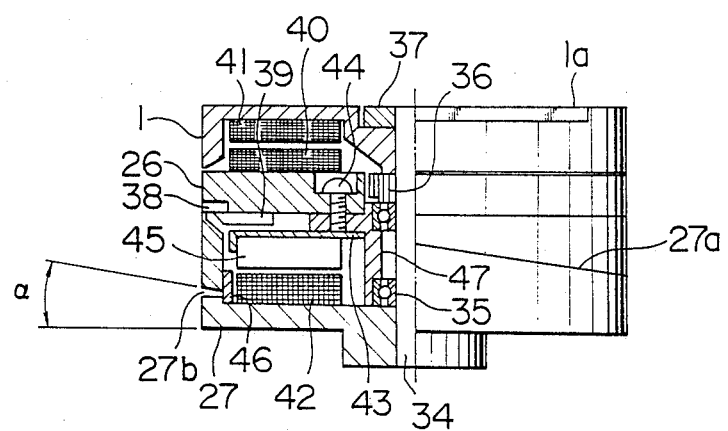
FIGS. 9, 10A and 10B are illustrations of examples of a cylinder section and a guide groove formed in the cylinder section.
Figure 10A:
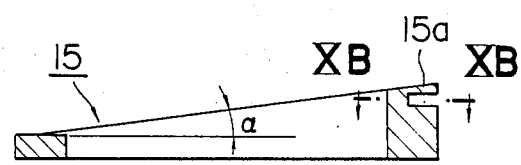
Figure 10B:
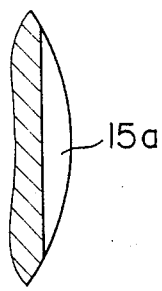

FIGS. 9, 10A and 10B show a practical example of the guide grooves 27b, 15a (see FIG. 5) formed in the cylinder section 1 and adapted for guiding the slider 11. Referring to FIG. 9, the stationary shaft 34 is press-fit in a bore formed in the lower fixed cylinder 27. A disk 47 incorporating a bearing is rotatable around the stationary shaft 34. A preloading member 36 prevents the disk 47 from moving in the direction of the thrust. The rotary cylinder 26 is fixed to the disk 47 by means of a screw 44. A magnet 45 is bonded to the magnet holder 43 and is driven electromagnetically by a coil 42 which is supplied with a driving current through lines which are not shown. Recording and reproducing signals are transmitted through a rotary transformer 40, 41. A head 38 is bonded to the head base 39 so as to form a head assembly. A plurality of head assemblies are mounted on the rotary cylinder 26, although only one head assembly is shown in the Figure. The upper fixed cylinder 1' is fixed to the stationary shaft 34 by means of a pressing plate 37. The guide groove 27b mentioned before is formed in one lateral side of the lower fixed cylinder 27. The guide groove 27b is inclined by an angle $\alpha$ with respect to the horizontal plate defined by the surface of the chassis 2. The upper surface of the cylinder base 15 also is tapered at $\alpha$ as shown in FIG. 10A. Therefore, when the cylinder section 1 is mounted on the cylinder base 15, the guide groove 27b extends horizontally. The other guide groove 15a is formed in the portion of the peripheral surface of the cylinder base 15 which diametrically opposes to the guide groove 27b.

These guide grooves 27b and 15a extend in parallel with each other in the direction of movement of the slider 11 as will be seen from FIG. 10B which is a sectional view taken along the line XB-XB in FIG. 10A. Referring back to FIG. 5, two legs 11b of the slider 11 are slidably received in the guide grooves 27b and 15a, whereby the slider 11 is guided by the guide grooves 27b and 15a when it moves between the unloading position and the loading position as explained before. Obviously, both the guide grooves 27b and 15a may be formed in the lower fixed cylinder 27 and the cylinder base 15, depending on the height of the slider 11 relative to the cylinder section 1.

Figure 11:
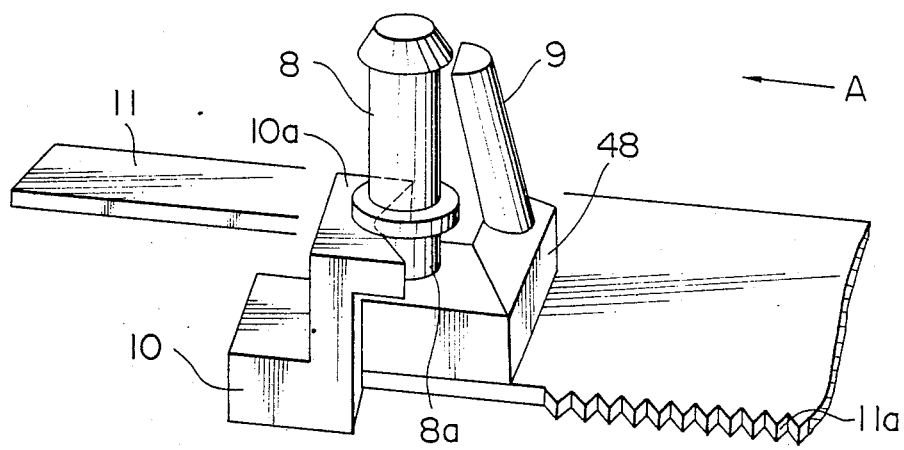
FIG. 11 is an illustration of an example of a slider positioning mechanism incorporating a stopper.

FIG. 11 shows a practical example of the mechanism for locating the slider 11 by means of the stopper 10. The guide roller 8 and the inclined pin 9 are press-fit in holes formed in a base 48 and are located with respect to the slider 11 through the intermediary of the base 48. The guide roller 8 has a boss 8a which is adapted to engage with the V-shaped groove 10a formed in the bent end of the stopper 10, thus determining the position of movement of the slider 11 in the direction of the arrow A during tape loading.

Figure 12:
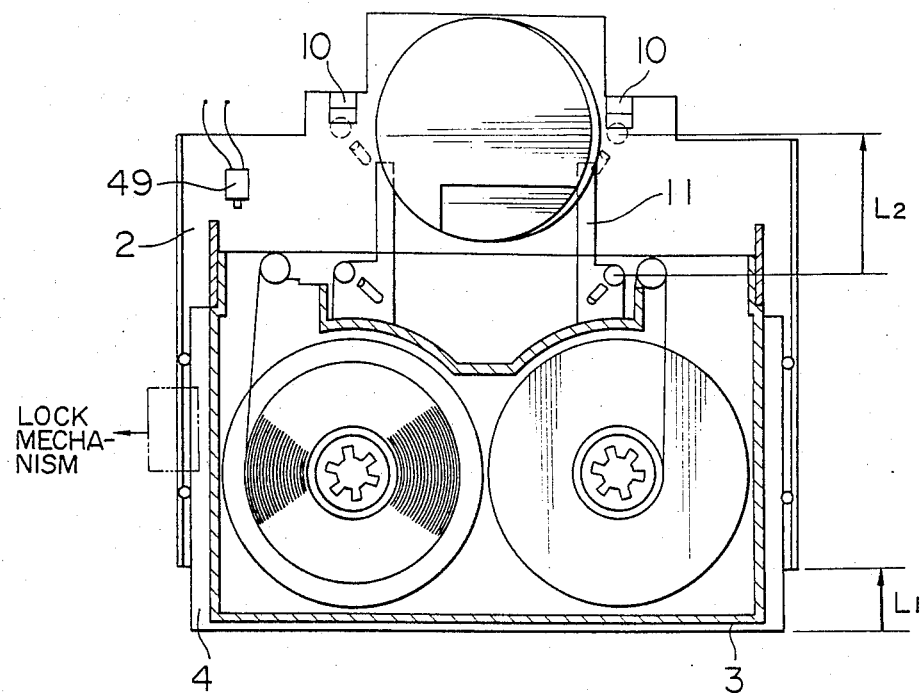
FIGS. 12 and 13 are illustrations of an example of a locking mechanism for locking the slide plate.
Figure 13:
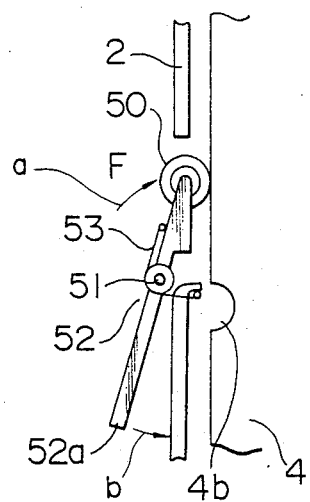
Figure 14:
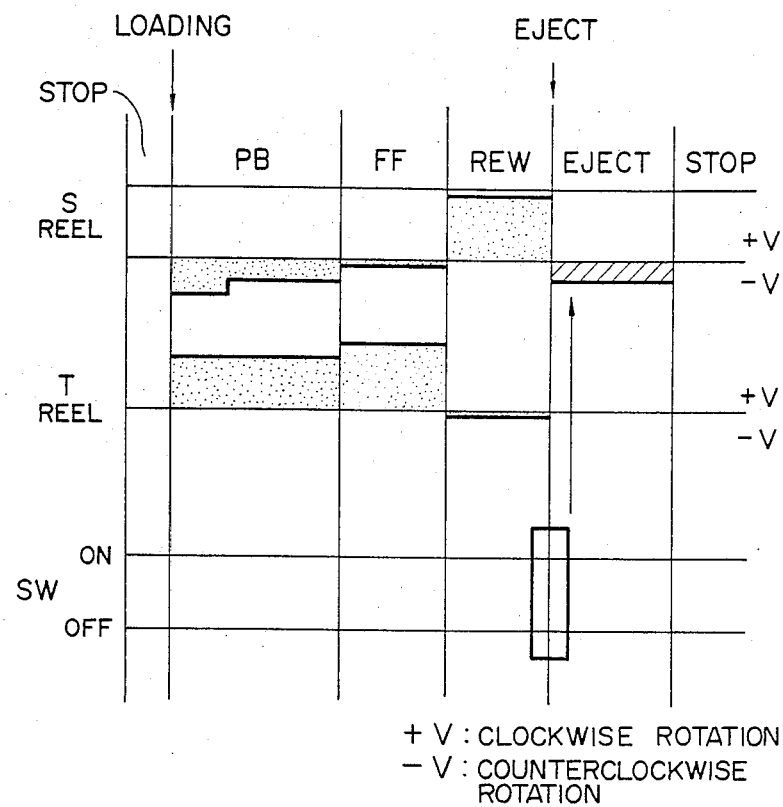
FIG. 14 is an illustration of operation of a supply reel motor and a take-up reel motor.

FIGS. 12 and 13 show a practical example of the locking mechanism for locking the slide plate 4 at the tape loading position. As stated before, the movement of the slider plate 4 in the direction of the arrow by an amount $L_1$ for mounting the cassette causes the slider 11 to be moved in the same direction by an amount $L_2$ greater than $L_1$, overcoming the tensile force $F_2$ of the tension spring 25, until the slider 11 is stopped by the stopper 10. It is, therefore, necessary to lock the slide plate 4 against the resetting force of thettensile spring 25, by a suitable locking means. To this end, a locking mechanism is provided on one side of the chassis 2 as shown by two-dot-and-dash line in FIG. 12. The detail of this locking mechanism is shown in FIG. 13. As will be understood from this Figure, the locking mechanism has a rotary arm 52, a supporting shaft 51 and a torsion spring 53 which urges the rotary arm in the direction of an arrow a thereby resiliently pressing a roller 50 on the end of the rotary arm 52 onto one side surface of the torsion spring 53.

A recess 46 is formed in one side surface of the slide plate 4. The arrangement is such that the roller 50 fits in the recess 46 when the slide plate 4 is moved by the distance $L_1$, thereby locking the slide plate 4 at the loading position. For unloading the tape, the end 52a of the rotary arm 52 is rotated in the direction of an arrow b by an unlocking means (not shown) operatively connected to, for example, an eject button shown in FIG. 3, thereby releasing the slide plate 4.

During the operation of the recording and reproducing apparatus, the magnetic tape, which has been extracted from the cassette, is wound around the cylinder section 1 through a predetermined angle. The unloading of the magnetic tape requires, as is well known to those skilled in the art, the magnetic tape to be taken-up by the supply reel so as to be accommodated in the cassette.

The take-up of the magnetic tape by the supply reel during unloading is controlled by a switch as shown in FIG. 12. The controlling operation performed by the switch 49 during unloading, as well as the control of the supply reel motor and the take-up reel motor, will be explained hereinunder with specific reference to FIG. 14 which shows the states of the voltages applied to the supply reel motor (S REEL) and the take-up reel (T REEL), as well as the state of the switch (SW), for each of different modes of operation. A symbol $+V$ represents a voltage for driving the reel motors clockwise, i.e., in the direction in which the magnetic tape is taken-up by the take-up reel, whereas a symbol $-V$ represents a voltage which causes the reel motors to be driven counter-clockwise, i.e., in the direction in which the magnetic tape is taken-up by the supply reel.

In the stop mode (STOP) of operation, both reel motors do not operate. Then, the apparatus is loaded with the magnetic tape and is switched to the playback mode (PB). In this mode, voltage $+V$ of a certain level is applied to the take-up reel motor (T REEL), while the supply reel motor (S REEL) is supplied with voltage $-V$ of a suitable level for the purpose of applying back tension to the tape. In the beginning period of the operation in the playback mode, the level of the voltage $-V$ is maintained high, in order to prevent slacking of the tape in the transient period. Meanwhile, the switch 49 is turned on, as a result of the forward movement of the slide plate 4 caused by the tape loading operation. Then, the operation is switched to, for example, the fast forwarding mode (FF). As a result, the level of the voltage $+V$ supplied to the take-up reel motor (T REEL) is increased, while the level of the voltage $-V$ supplied to the supply reel motor (S REEL) is decreased. Conversely, in the rewinding mode (REW), voltage $+V$ of high level is supplied to the supply reel motor (S REEL), while the take-up reel motor (T REEL) is supplied with a voltage $-V$ of a low level for applying back tension, so that the magnetic tape is rewound by the supply reel. Meanwhile, the switch 49 (SW) is kept in an ON state.

For ejecting the cassette 3, the user presses the eject button shown in FIG. 3. This mode is shown by EJECT in FIG. 14. As a result, the operation for unloading the magnetic tape is commenced to cause the slide plate 4 to move backward, so that the switch 49 (SW) is turned off. In the described embodiment, the voltage applied to the take-up reel motor is reduced to zero in response to the turning of the switch 49 (SW) into the OFF state, and the take-up reel motor is stopped by a suitable braking means, whereas the supply reel motor is supplied with voltage −V for a predetermined period, whereby the magnetic tape is taken-up by the supply reel so as to be retracted into the cassette. After elapse of the predetermined period, the supply of the voltage −V to the supply reel motor is ceased, and another suitable braking means is put into effect so as to brake and stop the supply reel motor, thus, the whole apparatus into the stop mode STOP.

Another embodiment of the present invention will be explained hereinunder with reference to FIGS. 15 to 17. This embodiment employs, as the tape loading movable member, a rotary arm 55 in place of the slider 11 of the preceding embodiment. Other portions are materially identical to those of the first embodiment.

Figure 15:
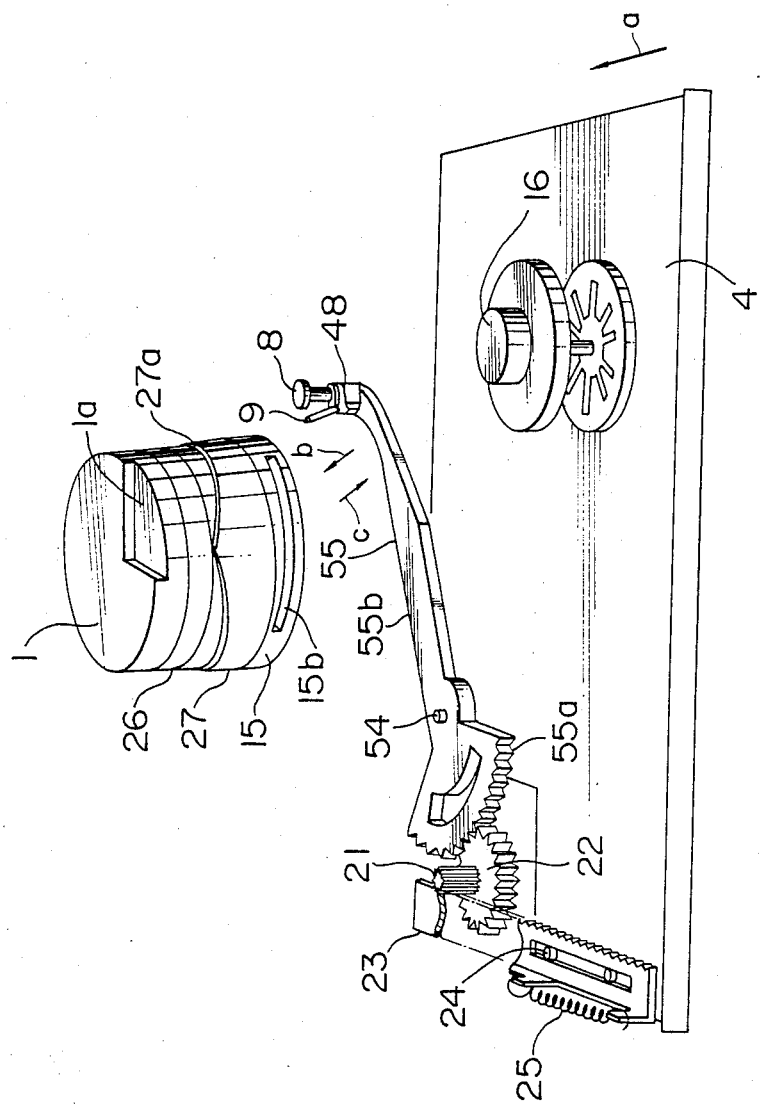
FIG. 15 is a perspective view of a second embodiment of the present invention.
Figure 16:
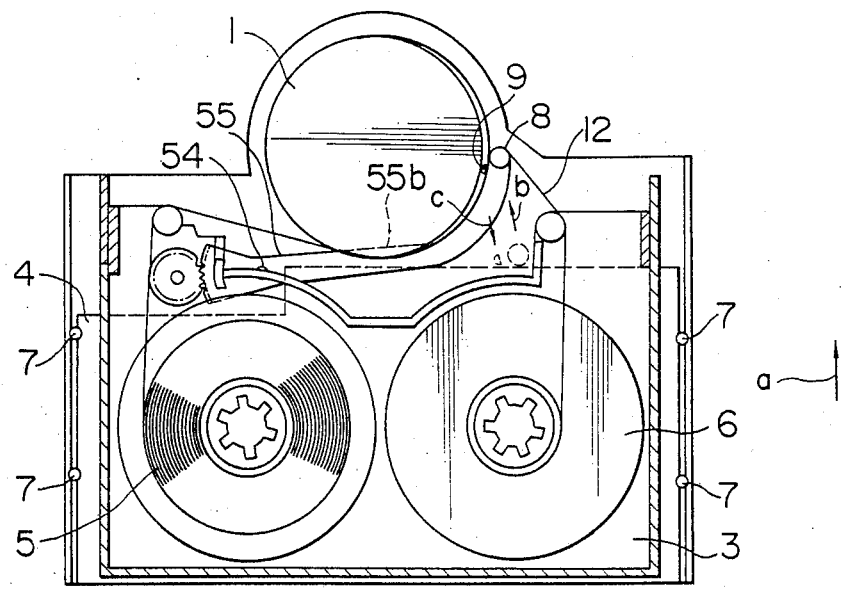
FIG. 16 is a plan view of the second embodiment.
Figure 17:
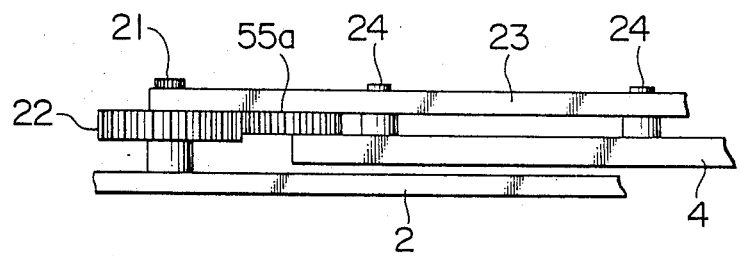
FIG. 17 is a fragmentary sectional view of the second embodiment.

FIG. 15 is a perspective view of this embodiment, corresponding to FIG. 5 which shows the preceding embodiment, while FIGS. 16 and 17, respectively, area plan view and a fragmentary sectional view which correspond to FIGS. 1 and 8. As will be understood from these Figures, the rotary arm 55 is rotatably supported by the stationary shaft 54 which is press-fit in a bore formed in the slide plate 4. As will be understood specifically from FIG. 15, a base 48 carrying the inclined pin 9 and the guide roller 8 is fixed to the end of the rotary arm 55. A gear portion 55a provided on the other end of the rotary arm 55 meshes with the gear 22.

As in the case of the preceding embodiment, the movement of the slide plate 4 in the direction of an arrow a for mounting the cassette causes the rotary arm 55 to be rotated in the direction of an arrow b through the operation of the rack plate 23, gears 21, 22, and the gear portion 55a.

The rotation of the rotary arm 55 in turn causes the magnetic tape 12 to be extracted from the cassette 3 by the guide roller 8 and the inclined pin 9, and to be wound on the cylinder section 1 through a predetermined angle by the operation of the guide roller 8 and the inclined pin 9, thus completing the loading as will be seen from FIG. 16. The angle through which the magnetic tape is wound on the cylinder section 1 is smaller than that in the preceding embodiment. In this state, a side portion 55b of the rotary arm 55 engages with a guide groove 15b (see FIG. 15) formed in the cylinder base 15 or in the lower fixed cylinder 27, thus locating the rotary arm 55. For the purpose of unloading of the tape, the rotary arm 55 is retracted as indicated by an arrow a, so that the magnetic tape 12 is retracted into the cassette 3 as in the case of the preceding embodiment.

As will be understood from the foregoing description, according to the present invention, it is possible to precisely locate and load the magnetic tape on and around the rotary head cylinder with a high degree of precision, by a very simple arrangement which is attained by the guide grooves formed in the rotary head cylinder so as to guide a tape loading movable member carrying a tape guide means. In addition, the tape loading operation is automatically effected without requiring any specific power source, when the apparatus is arranged such that the movement of the tape loading movable member is caused by the movement of the cassette holder into and out of the operating position, thus accomplishing a remarkable simplification of the tape loading mechanism.

Consequently, the present invention provides a magnetic recording and reproducing apparatus of rotary head type of reduced size and weight, thereby to overcoming the problems of the prior art.

What is claimed is:

1. A magnetic recording and reproducing apparatus of rotary head type having a tape loading mechanism which extracts a portion of a magnetic tape from a casette held by a cassette holder through a front opening of said cassette and places said portion of said magnetic tape on and around a cylinder carrying a rotary head through a predetermined angle, said magnetic recording and reproducing apparatus comprising:
   tape guide means for guiding said magnetic tape;
   a tape loading movable member carrying said tape guide means;
   tape loading driving means for driving said tape loading movable member so as to move said tape guide means between a tape loading position and an unloading position;
   locating means provided on at least one of said cylinder and a cylinder base carrying said cylinder, said locating means being adapted for engaging with said tape loading member in said tape loading position so as to locate said tape guide means with respect to said cylinder; and
   means drivingly connected to said loading driving means and movable in response to the movement of said cassette holder, for mounting said cassette on a predetermined portion of said tape loading movable member in accordance with the movement of said cassette holder for mounting said cassette on a predetermined portion of said apparatus.

2. A magnetic recording and reproducing apparatus according to claim 1, wherein said tape loading movable member comprises a substantially C-shaped slidable member including at least one guide means for guiding said magnetic tape and including teeth formed on a first end surface thereof adapted to engage with said tape loading driving means.

3. A magnetic recording and reproducing apparatus according to claim 1, wherein said tape loading movable member comprises a rotary arm pivotably mounted at substantially a first end thereof and including teeth formed at said first end thereof adapted to engage with said tape loading driving means.

4. A magnetic recording and reproducing apparatus according to claim 1, wherein said tape loading driving means includes a gear train and a spring activated rack plate for providing said tape loading movable member with a faster speed than said cassette holder such that said tape loading movable means engages with said locating means before said cassette holder.

5. A magnetic recording and reproducing apparatus according to claim 4, wherein said rack plate is guided by at least one guide pin located in an elongated slot of said rack plate.

* * * * *